(12) United States Patent
Dire et al.

(10) Patent No.: US 9,856,330 B2
(45) Date of Patent: Jan. 2, 2018

(54) DIENE ELASTOMER MODIFIED BY COUPLING HAVING SILANOL FUNCTIONS, SYNTHESIS METHOD FOR SAME, AND RUBBER COMPOSITION COMPRISING MODIFIED DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Charlotte Dire, Clermont-Ferand (FR); Jean-Marc Marechal, Clermont-Ferrand (FR); Margarita Dorato, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, Granges-Paccot (CH)

( * ) Notice: Subject to any disclaimer, the term of this patent is extended or adjusted under 35 U.S.C. 154(b) by 0 days.

(21) Appl. No.: 14/910,233

(22) PCT Filed: Jul. 11, 2014

(86) PCT No.: PCT/EP2014/064980
§ 371 (c)(1),
(2) Date: Feb. 4, 2016

(87) PCT Pub. No.: WO2015/018600
PCT Pub. Date: Feb. 12, 2015

(65) Prior Publication Data
US 2016/0362504 A1    Dec. 15, 2016

(30) Foreign Application Priority Data
Aug. 8, 2013 (FR) ..................... 13 57889

(51) Int. Cl.
| C08C 19/25 | (2006.01) |
| C08C 19/44 | (2006.01) |
| C08L 15/00 | (2006.01) |
| B60C 1/00 | (2006.01) |
| C08F 236/10 | (2006.01) |
| C08K 3/00 | (2006.01) |

(52) U.S. Cl.
CPC ............... *C08C 19/25* (2013.01); *B60C 1/00* (2013.01); *B60C 1/0016* (2013.01); *C08C 19/44* (2013.01); *C08F 236/10* (2013.01); *C08K 3/0033* (2013.01); *C08L 15/00* (2013.01)

(58) Field of Classification Search
CPC ...... C08F 297/04; C08F 297/044; C08F 8/32; C08F 8/42; C08F 236/10; C08L 53/025; C08L 15/00; C08K 3/0033; B60C 1/00; B60C 1/0016; C08C 19/22; C08C 19/25; C08C 19/44
See application file for complete search history.

(56) References Cited

U.S. PATENT DOCUMENTS

| 5,015,692 A * | 5/1991 | Takao ................ C08C 19/42 525/102 |
| 9,175,124 B2 * | 11/2015 | Chaboche ............ B60C 1/0016 |
| 2004/0054065 A1 | 3/2004 | Zanzig et al. |
| 2009/0203843 A1 * | 8/2009 | Fukuoka ................ C08C 19/44 525/105 |
| 2010/0063202 A1 * | 3/2010 | Halasa ................ C08C 19/44 524/572 |
| 2010/0184912 A1 | 7/2010 | Marechal et al. |
| 2011/0146877 A1 * | 6/2011 | Tanaka ................ B60C 1/00 152/547 |
| 2011/0178233 A1 | 7/2011 | Chaboche et al. |
| 2012/0252966 A1 * | 10/2012 | Ito ............... C08C 19/25 524/575 |
| 2013/0023624 A1 * | 1/2013 | Sekikawa ............ C08C 19/44 524/572 |

FOREIGN PATENT DOCUMENTS

| EP | 1398347 A1 | 3/2004 |
| FR | 2915202 A1 | 10/2008 |
| FR | 2930554 A1 | 10/2009 |

OTHER PUBLICATIONS

International Search Report for Application PCT/EP2014/ 064980 dated Nov. 19, 2014.

* cited by examiner

*Primary Examiner* — Satya Sastri
(74) *Attorney, Agent, or Firm* — Dickinson Wright PLLC

(57) ABSTRACT

The present invention relates to a modified diene elastomer predominantly comprising a species coupled via a group bearing a function comprising a silicon atom predominantly hydrolyzed into silanol and a tertiary amine function, linked to the diene elastomer via the silicon atom, and to the process for synthesizing the modified diene elastomer. This elastomer has the particular feature of not undergoing any change in Mooney viscosity during its storage.

16 Claims, No Drawings

DIENE ELASTOMER MODIFIED BY COUPLING HAVING SILANOL FUNCTIONS, SYNTHESIS METHOD FOR SAME, AND RUBBER COMPOSITION COMPRISING MODIFIED DIENE ELASTOMER

This application is a 371 national phase entry of PCT/EP2014/064980, filed 11 Jul. 2014, which claims benefit of French Patent Application No. 1357889, filed 8 Aug. 2013, the entire contents of which are incorporated herein by reference for all purposes.

BACKGROUND

1. Field

The present invention relates to a modified diene elastomer comprising a group bearing a function comprising a silicon atom predominantly hydrolysed into silanol and a tertiary amine function, and also to a process for synthesizing this diene elastomer. The present invention also relates to a reinforced rubber composition, which can be used especially in the manufacture of tires, comprising this modified diene elastomer.

2. Description of Related Art

Now that savings in fuel and the need to protect the environment have become a priority, it is desirable to produce blends that have good mechanical properties and hysteresis that is as low as possible in order to be able to use them in the form of rubber compositions that may be used in the manufacture of various semi-finished products included in the composition of tires.

Many solutions have already been explored to achieve the objective of lowering hysteresis. Mention may be made in particular of modification of the structure of diene polymers and copolymers by means of functionalization agents, with the aim of obtaining good interaction between the polymer thus modified and the filler, whether it is carbon black or another reinforcing filler.

Among numerous diene elastomer modifications, it has especially been proposed to improve the properties of rubber compositions by using elastomers functionalized with a silanol function.

Patent applications EP 0 778 311 A1, EP 0 786 493 A1 and EP 0 877 047 A1 have described a rubber composition reinforced using, respectively, as reinforcing filler, silica, carbon black and carbon black bearing silica fixed onto its surface, based on a diene polymer functionalized at the chain end with a silanol function or a polysiloxane block bearing at least one silanol end group or a diene polymer functionalized along its chain with silanol functions.

Patent application EP 2 139 703 proposes a functional elastomer having monomodal distribution of the number-average molecular masses of the chains, bearing a silanol function located essentially in the middle of the chain. This functional elastomer offers a composition containing it an improved compromise in terms of use in raw form/hysteresis especially relative to an elastomer essentially functionalized at the end of the chain with a silanol function.

It has also been proposed to combine the functionalization of diene elastomers by combining a silanol function with another function. Thus, patent application WO 2009/077 837 A1 describes an elastomer functionalized at one chain end with a silanol function, the other chain end bearing an amine function.

Moreover, patent application EP 2 266 819 A1 proposes, in view of its properties of attenuating heating and its synthesis limiting the production of volatile organic compounds, a diene elastomer functionalized at the end of the chain with a silanol function bearing a function promoting bonding between the silanol function of the elastomer and the reinforcing filler in a rubber composition.

Nevertheless, it appears that certain diene elastomers modified with a group bearing both an amine function and a silanol function pose problems of evolution of the macrostructures especially during storage, which leads to degradation of the potentially advantageous properties of these elastomers. Most particularly, it turns out that certain diene elastomers functionalized at the end of the chain with a silanol function bearing an amine function lead to large changes in Mooney viscosity.

The problem of evolution of macrostructure during the synthesis or storing of modified diene elastomers is known especially in relation with modified elastomers comprising alkoxysilane functions.

Numerous studies have focused on Mooney stabilization during the synthesis of this type of modified elastomer and during its storage. As an illustration, mention may be made of patent EP 0 801 078 B1 claiming the addition of a carboxylic acid to the elastomer solution, before the stripping step, in order to neutralize the basicity introduced by the anionic polymerization initiator and to minimize the hydrolysis of the alkoxysilane groups. Patent EP 1 198 506 B1 proposes to add a compound of alkyl alkoxysilane type $(R^1{}_n Si(OR^2)_{4-n})$ to the elastomer solution, before the stripping step, with a high (20/1) $n(R^1{}_n Si(OR^2)_{4-n})/n$(Polymer-SiOR') mole ratio so as to promote the reaction between the alkyl alkoxysilane and a part of the polymer that is in its totally or partially hydrolysed form, Polymer-SiOH, on stripping. Finally, mention may be made of patent EP 1 237 934 B1 which describes the addition of a long-chain alcohol to the elastomer solution, before the stripping step, so as to minimize the hydrolysis reactions on stripping and consequently the formation of Si—O—Si bonds during storage.

Nevertheless, these processes do not adopt the approach initiated in patent application EP 2 266 819 A1 of minimizing the impact of the synthetic process on the emission of volatile organic compounds.

SUMMARY

The problem that the present invention proposes to solve is that of providing a modified diene elastomer whose working properties are stabilized. One object of the invention is notably to propose a modified diene elastomer that undergoes a significantly reduced change in Mooney viscosity especially during the storage period, which is simple to synthesize and which conserves characteristics that are advantageous for use in the manufacture of tires, contributing especially towards reducing the rolling resistance.

The technical problem is solved in that the invention proposes a diene elastomer modified by coupling using an agent bearing at least one tertiary amine function and a function that can be hydrolysed into silanol, the silicon atom linking the two elastomer chains. Specifically, this modified diene elastomer, bearing a function comprising a silicon atom predominantly hydrolysed into silanol and a tertiary amine function, has significantly improved stability on storage since no change in Mooney viscosity is observed during a storage period of at least 130 days. This elastomer may be synthesized via a process which, after polymerization, comprises a hydrolysis step to hydrolyse all or some of the hydrolysable functions into silanol. Such a synthetic method is disclosed in patent application EP 2 266 819 A1 which also describes it as limiting the emission of volatile organic compounds.

One subject of the invention is a modified diene elastomer predominantly comprising the species coupled via a group bearing a function comprising a silicon atom predominantly hydrolysed into silanol and a tertiary amine function, said group being linked to the diene elastomer via the silicon atom.

Another subject of the invention is a process for synthesizing said modified diene elastomer.

Another subject of the invention is a reinforced rubber composition based on at least one reinforcing filler and on an elastomer matrix comprising at least said modified diene elastomer.

DETAILED DESCRIPTION OF THE SPECIFIC EMBODIMENTS

In the present description, unless expressly indicated otherwise, all the percentages (%) indicated are mass percentages. Furthermore, any interval of values denoted by the expression "between a and b" represents the range of values extending from more than a to less than b (i.e. limits a and b excluded), whereas any interval of values denoted by the expression from "a to b" means the range of values extending from a up to b (i.e. including the strict limits a and b).

It should be pointed out that it is known to a person skilled in the art that, when an elastomer is modified by reaction of a functionalization agent with the living elastomer resulting from an anionic polymerization step, a mixture of modified species of this elastomer is obtained, the composition of which depends especially on the proportion of reactive sites of the functionalization agent relative to the number of living chains. This mixture comprises species functionalized at the chain end, coupled, star-branched and/or non-functionalized.

In the present description, the term "species coupled" or "elastomer coupled" via a group bearing a function comprising a silicon atom predominantly hydrolysed into silanol and a tertiary amine function, means a diene elastomer bearing the group in question within its elastomer chain, the silicon atom of this group linking the two pieces of the chain of the diene elastomer. It is said that the elastomer is coupled or functionalized in the middle of the chain, as opposed to the position "the chain end", even though the group is not located precisely at the middle of the elastomer chain.

In the present patent application, the term "predominantly" or "predominant", in connection with a compound, means that this compound is predominant among the compounds of the same type in the composition, i.e. that it is the one which represents the largest fraction by weight among the compounds of the same type. Thus, for example, a predominant elastomer is the elastomer representing the largest fraction by weight, relative to the total weight of the elastomers in the composition. In the same way, a "predominant" filler is that representing the largest fraction by weight, relative to the total weight of the combined fillers of the composition. Also, a "predominant" functional species of a modified diene elastomer is that representing the largest fraction by weight among the functionalized species constituting the diene elastomer, relative to the total weight of the modified diene elastomer. In a system comprising just one compound of a certain type, the latter is predominant within the meaning of the present invention.

The expression "composition based on" in connection with a composition should be understood as meaning a composition comprising, in a non-limiting manner, the mixture and/or the reaction product of the various constituents used, some of these base constituents being capable of reacting or being intended to react with each other, at least in part, during the various phases of manufacture of the composition, in particular during the crosslinking or vulcanization thereof.

Thus, one subject of the invention is a modified diene elastomer predominantly comprising the species coupled via a group bearing a function comprising a silicon atom predominantly hydrolysed into silanol and a tertiary amine function, linked to the diene elastomer via the silicon atom. Preferentially, the modified diene elastomer comprises at least 50% by weight and more preferentially at least 70% by weight of the coupled species relative to the total weight of the modified diene elastomer.

The term "function comprising a silicon atom predominantly hydrolysed into silanol" means a function that is hydrolysable into silanol, for which at least 50% of the total number of hydrolysable functions are hydrolysed into silanol, i.e. a function that is hydrolysable into silanol hydrolysed to at least 50 mol %.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" means any homopolymer obtained by polymerization of a conjugated diene monomer containing from 4 to 12 carbon atoms, or any copolymer obtained by copolymerization of one or more conjugated dienes with each other or with one or more vinylaromatic compounds containing from 8 to 20 carbon atoms. In the case of copolymers based on vinylaromatic compounds, the latter contain from 20% to 99% by weight of diene units and from 1% to 80% by weight of vinylaromatic units.

The following are especially suitable as conjugated dienes that may be used in the process in accordance with the invention: 1,3-butadiene, 2-methyl-1,3-butadiene, 2,3-di(C1 to C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene or 2,4-hexadiene, etc.

The following are especially suitable as vinylaromatic compounds: styrene, ortho-, meta- or para-methylstyrene, the "vinyltoluene" commercial mixture, para-(tert-butyl) styrene, methoxystyrenes, vinylmesitylene, divinylbenzene, vinylnaphthalene, and the like.

The diene elastomer of the composition in accordance with the invention is preferentially chosen from the group of highly unsaturated diene elastomers consisting of polybutadienes (BR), synthetic polyisoprenes (IR), butadiene copolymers, isoprene copolymers and mixtures of these elastomers. Such copolymers are more particularly butadiene/styrene copolymers (SBR), isoprene/butadiene copolymers (BIR), isoprene/styrene copolymers (SIR) and isoprene/butadiene/styrene copolymers (SBIR). Among these copolymers, butadiene/styrene copolymers (SBRs) are particularly preferred.

According to one embodiment of the invention, the coupled species of the modified diene elastomer may be represented by formula 1:

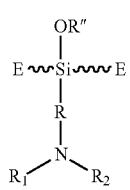

Formula 1 in which:
- the symbol E denotes a diene elastomer,
- R is a linear or branched $C_1$-$C_{10}$ alkylene, $C_6$-$C_{18}$ arylene or $C_7$-$C_{18}$ aralkylene divalent hydrocarbon-based group, preferably a $C_1$-$C_{10}$ alkylene radical, more preferentially a linear $C_3$ alkylene radical,
- $R_1$ and $R_2$, which may be identical or different, represent a $C_1$-$C_{18}$, or even $C_1$-$C_{10}$ and preferably $C_1$-$C_4$ alkyl radical, especially methyl or ethyl, more preferentially a methyl radical, or else $R_1$ and $R_2$ form, with N to which they are attached, a heterocycle containing a nitrogen atom and at least one carbon atom, preferably from 2 to 6 carbon atoms,
- —OR" represents an alkoxy function, hydrolysed to at least 50%, preferably at least 80%, more preferentially 100%, the alkyl radical comprising 1 to 5 and preferably 1 or 2 carbon atoms.

Thus, according to a preferential variant of the invention, 100% of the functions that are hydrolysable into silanol are hydrolysed and the coupled species of the modified diene elastomer may be represented by formula 1b:

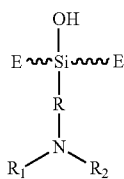

Formula 1b in which E, R, $R_1$ and $R_2$ are as defined above.

The modified diene elastomer according to the invention may be prepared according to a process including modification of the elastomer by reaction of a living diene elastomer with a suitable functionalization agent, i.e. any at least difunctional molecule, for the purpose of coupling, the function being any type of chemical group known by a person skilled in the art to react with a living chain end. Such a process also forms the subject of the invention.

According to one synthetic process, the modified diene elastomer may be obtained by performing the following steps:
- anionic polymerization of at least one conjugated diene monomer in the presence of a polymerization initiator,
- modification of the living diene elastomer bearing an active site obtained in the preceding step with a functionalization agent, capable of coupling the elastomer chains, bearing at least one function that is hydrolysable into silanol and a tertiary amine function, with a mole ratio of the functionalization agent to the polymerization initiator with a value ranging from 0.35 to 0.65,
- hydrolysis of the modified elastomer obtained in the preceding step.

Use may be made, as polymerization initiator, of any known monofunctional anionic initiator. However, an initiator comprising an alkali metal, such as lithium, is preferably used. Representative compounds are aliphatic organolithium compounds, such as ethyllithium, n-butyllithium (n-BuLi) or isobutyllithium, or lithium amides obtained from a cyclic secondary amine, such as pyrrolidine and hexamethyleneimine.

The polymerization is preferably performed in the presence of an inert hydrocarbon-based solvent, which may be, for example, an aliphatic or alicyclic hydrocarbon, such as pentane, hexane, heptane, isooctane, cyclohexane or methylcyclohexane, or an aromatic hydrocarbon, such as benzene, toluene or xylene.

The polymerization may be performed continuously or batchwise. The polymerization is generally performed at a temperature of between 20° C. and 150° C. and preferably in the region of 30° C. to 110° C.

The diene elastomer may have any microstructure which depends on the polymerization conditions used. The elastomer may be a block, statistical, sequential, microsequential, etc. elastomer and may be prepared in dispersion or in solution. The microstructure of this elastomer may be determined by the presence or absence of a modifying and/or randomizing agent and the amounts of modifying and/or randomizing agent employed.

The second step of the process according to the invention consists of modification of the living diene elastomer, obtained after the anionic polymerization step, under operating conditions which promote the coupling reaction of the diene elastomer with a suitable functionalization agent. This step results in the synthesis of a modified diene elastomer predominantly comprising the coupled species. Ok Thus, the reaction for modification of the living diene elastomer, obtained after the first step, may take place at a temperature of between −20° C. and 100° C., by addition to the living polymer chains or vice versa of a non-polymerizable functionalization agent capable of forming a group bearing a function that is hydrolysable into silanol and a tertiary amine function, linking two elastomer chains via its silicon atom. This non-polymerizable functionalization agent makes it possible especially to obtain the structures of formula 1 above. It is in particular a functionalization agent bearing at least one function that is hydrolysable into silanol, and two functions that are reactive with the living elastomer, each of these two functions being directly linked to the silicon atom, and also a tertiary amine function.

It may be, for example, a compound bearing a group of the type —Si(OR)$_3$, R being a $C_1$-$C_5$, preferentially $C_1$-$C_2$ hydrolysable alkyl radical, and a tertiary amine function, or alternatively a compound bearing a function —SiX$_3$, the substituents X denoting, independently of each other, a group —OR, R being a $C_1$-$C_5$, preferentially $C_1$-$C_2$ alkyl, or a halogen, more particularly Cl, and a tertiary amine function.

According to one variant of the process of the invention, the functionalization agent corresponds to formula 2:

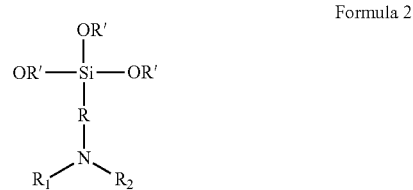

Formula 2 in which:
- R is a linear or branched $C_1$-$C_{10}$ alkylene, $C_6$-$C_{18}$ arylene or $C_7$-$C_{18}$ aralkylene divalent hydrocarbon-based group, preferably a $C_1$-$C_{10}$ alkylene radical, more preferentially a linear $C_3$ alkylene radical,
- $R_1$ and $R_2$, which may be identical or different, represent a $C_1$-$C_{18}$, or even $C_1$-$C_{10}$ and preferably $C_1$-$C_4$ alkyl radical, especially methyl or ethyl, more preferentially a methyl radical, or else $R_1$ and $R_2$ form, with N to which they are attached, a heterocycle containing a nitrogen atom and at least one carbon atom, preferably from 2 to 6 carbon atoms,
- the substituted or unsubstituted radicals R', which may be identical to or different from each other, represent a $C_1$-$C_5$ alkyl group, preferably a $C_1$-$C_2$ alkyl group.

Examples of functionalization agents corresponding to formula 2 that may be mentioned include N,N-dialkylaminopropyltrialkoxysilanes, the alkyl substituents of these agents being linear or branched and generally containing from 1 to 18, or even from 1 to 10 and preferentially from 1 to 4 carbon atoms, or even methyl and ethyl, more preferentially methyl. The alkoxy substituents are linear or branched and generally contain from 1 to 5 and preferably from 1 to 2 carbon atoms.

Preferentially, the functionalization agent is chosen from 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane, 3-(N,N-dipropylaminopropyl)trimethoxysilane, 3-(N,N-dipropylaminopropyl)triethoxysilane, 3-(N,N-dibutylaminopropyl)trimethoxysilane, 3-(N,N-dibutylaminopropyl)triethoxysilane, 3-(N,N-dipentylaminopropyl)trimethoxysilane, 3-(N,N-dipentylaminopropyl)triethoxysilane, 3-(N,N-dihexylaminopropyl)trimethoxysilane, 3-(N, N-dihexylaminopropyl)triethoxysilane, 3-(hexamethyleneiminopropyl)trimethoxysilane and 3-(hexamethyleneiminopropyl)triethoxysilane. Even more preferably, the functionalization agent is 3-(N,N-dimethylaminopropyl)trimethoxysilane.

According to another variant of the process of the invention, the functionalization agent is a compound bearing a function —$SiX_3$, X being a halogen, especially Br or Cl, more particularly Cl, and a tertiary amine function whose alkyl substituents are linear or branched and generally contain from 1 to 18, or even from 1 to 10 and preferably from 1 to 4 carbon atoms, or even methyl and ethyl, more preferentially methyl.

Examples of functionalization agents of this another variant that may be mentioned include 3-(N,N-dimethylaminopropyl)trichlorosilane, 3-(N,N-dipropylaminopropyl)triethoxysilane, 3-(N,N-diethylaminopropyl)trichlorosilane, 3-(N,N-dibutylaminopropyl)trichlorosilane, 3-(N,N-dipentylaminopropyl)trichlorosilane, 3-(N,N-dihexylaminopropyl)trichlorosilane, and 3-(hexamethyleneiminopropyl)trichlorosilane.

The mole ratio between the functionalization agent and the metal of the initiator of the living polymer chains is from 0.35 to 0.65, preferentially from 0.40 to 0.60 and even more preferentially from 0.45 to 0.55.

The time for reaction between the living diene polymer and the functionalization agent may be between 10 seconds and 2 hours.

The step of modification of the living diene elastomer is followed according to the invention by a hydrolysis step, which is capable of hydrolysing all or at least 50% of the functions that are hydrolysable into silanol borne by the modified diene elastomer. Preferentially, at least 80% of the functions are hydrolysed, even more preferentially 100%.

The reaction for hydrolysis of the modified elastomer obtained in the preceding step may be performed via any known means. In particular, the hydrolysis is performed in the presence of water under acidic, neutral or basic conditions. Water is used in excess relative to the polymerization initiator (mole ratio greater than 1). The hydrolysis time may be between 10 seconds and a few hours. In the case of a hydrolysis performed under acidic conditions and making it possible to achieve degrees of hydrolysis of at least 80%, preferentially 100%, compounds of the type such as mineral acids (for example hydrochloric acid, sulfuric acid or nitric acid), carboxylic acids (for example formic acid or acetic acid), titanium tetrachloride or silicon tetrachloride may be added. In the case of a hydrolysis performed under basic conditions and making it possible to achieve degrees of hydrolysis of at least 80%, preferentially 100%, compounds of the type such as alkali metal hydroxides (for example sodium hydroxide or potassium hydroxide) may be added.

According to one variant of the process of the invention, this process may comprise, prior to the step for modification of the elastomer with the functionalization agent bearing at least one function that is hydrolysable into silanol and a tertiary amine function, a step of modification by reaction with a star-forming or coupling agent that is known per se, for example based on tin or silicon. This variant is advantageously performed in order to reduce the creep in the raw state of the modified diene elastomer according to the invention.

As a result of the known effect of the functions that it bears on the hysteresis of rubber compositions, and of its improved use in raw form, the modified diene elastomer according to the invention is advantageously used in rubber compositions especially intended for the manufacture of tires. Thus, another subject of the invention is a reinforced rubber composition based on at least one reinforcing filler and an elastomer matrix comprising at least one modified diene elastomer as described above.

The reinforced rubber composition according to the invention can be provided in the crosslinked state or in the non-crosslinked, in other words crosslinkable, state.

It should be understood that the rubber composition can comprise one or more of these modified diene elastomers according to the invention.

The modified diene elastomer predominantly comprising the elastomer coupled via a group bearing a function comprising a silicon atom predominantly hydrolysed into silanol and a tertiary amine function, linked to the diene elastomer via the silicon atom, may, according to different variants of the invention, be used alone in the composition or blended with at least one other conventional diene elastomer, whether it is star-branched, coupled, functionalized or non-functionalized. Preferentially, this other diene elastomer used in the invention is chosen from the group of highly unsaturated diene elastomers consisting of polybutadienes (abbreviated as BR), synthetic polyisoprenes (IR), natural rubber (NR), butadiene copolymers, isoprene copolymers and mixtures of these elastomers. Such copolymers are more preferentially chosen from the group consisting of butadiene/styrene copolymers (SBR), isoprene/butadiene copolymers (BIR), isoprene/styrene copolymers (SIR) and isoprene/butadiene/styrene copolymers (SBIR). It is also possible to envisage a blend with any synthetic elastomer other than a diene elastomer, or even with any polymer other than an elastomer, for example a thermoplastic polymer.

According to one variant of the invention, the reinforced rubber composition is based on an elastomer matrix predominantly comprising (i.e. the weight fraction is the highest relative to the total weight of the elastomer matrix) the modified diene elastomer predominantly comprising the species coupled with a group bearing a function comprising a silicon atom predominantly hydrolysed into silanol and a tertiary amine function linked to the diene elastomer via the silicon atom. When the conventional elastomer used in blending is natural rubber and/or one or more diene polymers, for instance polybutadienes, polyisoprenes or butadiene/styrene or butadiene/styrene/isoprene copolymers, this or these modified or unmodified elastomers may then be present at from 1 to 70 parts by weight per 100 parts of modified diene elastomer according to the invention. More particularly, this matrix consists solely of this modified diene elastomer according to the present invention.

The rubber composition of the invention comprises, besides at least one elastomer matrix as described above, at least one reinforcing filler. This reinforcing filler may be, for example, carbon black, a mineral reinforcing filler such as silica, with which a coupling agent is combined in a known manner, or else a mixture of these two types of filler. According to one variant of the invention, the reinforcing filler is of siliceous type.

The rubber compositions in accordance with the invention may also comprise all or some of the usual additives generally used in elastomer compositions intended for the manufacture of tires, for instance pigments, non-reinforcing fillers, protective agents, such as antiozone waxes, chemical antiozonants or antioxidants, antifatigue agents, plasticizers, reinforcing or plasticizing resins, methylene acceptors or donors, a crosslinking system based either on sulfur or on sulfur donors and/or on peroxide and/or on bismaleimides, vulcanization accelerators or vulcanization activators.

A subject of the invention is also a tire which incorporates, in at least one of its constituent elements, a reinforced rubber composition according to the invention, and more particularly semi-finished articles of a tire which comprise this composition, especially the tread.

The abovementioned characteristics of the present invention, and also others, will be better understood on reading the following description of several implementational examples of the invention, which are given as non-limiting illustrations.

EXAMPLES OF PREPARATION OF THE ELASTOMER

Measurements and Tests Used

Experimental Techniques Used for the Pre-Curing Characterization of the Polymers Obtained (a) The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 g·L$^{-1}$. The solution is then filtered through a filter with a porosity of 0.45 μm before injection.

The apparatus used is a Waters Alliance chromatographic line. The elution solvent is either tetrahydrofuran or tetrahydrofuran +1 vol % of diisopropylamine +1 vol % of triethylamine, the flow rate is 1 ml·min$^{-1}$, the temperature of the system is 35° C. and the analytical time is 30 min. A set of two Waters columns with the Styragel HT6E trade name is used. The volume of the solution of the polymer sample injected is 100 μL. The detector is a Waters 2410 differential refractometer and the software for processing the chromatographic data is the Waters Empower system.

The calculated average molar masses are relative to a calibration curve produced for SBRs having the following microstructure: 25% by mass of units of styrene type, 23% by mass of units of 1,2-type and 50% by mass of units of trans-1,4-type.

(b) The high-resolution SEC technique is used to determine the mass percentages of the various populations of chains present in a polymer sample.

There is no specific treatment of the polymer sample before analysis. The latter is simply dissolved in the elution solvent at a concentration of approximately 1 g·L$^{-1}$. The solution is then filtered through a filter with a porosity of 0.45 μm before injection.

The apparatus used is a Waters Alliance 2695 chromatographic line. The elution solvent is tetrahydrofuran, the flow rate is 0.2 ml·min$^{-1}$ and the temperature of the system is 35° C. A set of three identical columns in series is used (Shodex, length 300 mm, diameter 8 mm) The number of theoretical plates of the set of columns is greater than 22 000. The volume of the solution of the polymer sample injected is 50 μL. The detector is a Waters 2414 differential refractometer and the software for processing the chromatographic data is the Waters Empower system.

The calculated molar masses are relative to a calibration curve produced for SBRs having the following microstructure: 25% by mass of units of styrene type, 23% by mass of units of 1,2-type and 50% by mass of units of trans-1,4-type.

(c) Determination of the Mooney $ML_{(1+4)}$100° C. viscosities for the elastomers according to Standard ASTM D1646.

Use is made of an oscillating consistometer as described in Standard ASTM D-1646. The Mooney plasticity measurement is performed according to the following principle: the elastomer is moulded in a cylindrical chamber heated to 100° C. After preheating for one minute, the rotor rotates within the test specimen at 2 rev·min$^{-1}$ and the working torque for maintaining this movement after rotating for 4 minutes is measured. The Mooney plasticity ($ML_{1+4}$)) is expressed in "Mooney unit" (MU, with 1 MU=0.83 N·m).

(d) Determination of the glass transition temperatures (Tg) of the elastomers by means of a differential scanning calorimeter.

(e) Determination of the content of $SiOCH_3$ functions by nuclear magnetic resonance (NMR).

The NMR analyses are performed on a Brüker 500 MHz spectrometer equipped with a 5 mm BBIz "broad band" probe. For the quantitative $^1H$ NMR experiment, the sequence uses a 30° pulse and a repetition time of 2 seconds. The samples are dissolved in carbon disulfide ($CS_2$). 100 μL of deuterated cyclohexane ($C_6D_{12}$) are added for the lock signal.

(f) Characterization of the microstructure of the elastomers by the near-infrared spectroscopy (NIR) technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] performed using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 $cm^{-1}$ with a resolution of 2 $cm^{-1}$ using a Brüker Tensor 37 Fourier-transform near-infrared spectrometer equipped with an InGaAs detector cooled by the Peltier effect.

(g) Determination of the intrinsic viscosity of the elastomers at 25° C. using a 0.1 $g \cdot dL^{-1}$ solution of elastomer in toluene, according to the following principle:

The intrinsic viscosity is determined by the measurement of the flow time t of the polymer solution and of the flow time $t_o$ of the toluene in a capillary tube.

The flow time of the toluene and the flow time of the 0.1 $g \cdot dL^{-1}$ polymer solution are measured in an Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{inh} = \frac{1}{C} \ln\left[\frac{(t)}{(t_O)}\right]$$

with:

C: concentration of the solution of polymer in toluene in $g \cdot dL^{-1}$, t: flow time of the solution of polymer in toluene in seconds, $t_o$: flow time of the toluene in seconds, $\eta_{inh}$: intrinsic viscosity, expressed in $dL \cdot g^{-1}$.

Preparation of Polymer A: Coupled SBR According to the Invention 2.0 kg of styrene and 4.7 kg of butadiene, and also 354 ml of a 0.0695 $mol \cdot L^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.3 L of 0.059 $mol \cdot L^{-1}$ n-butyllithium in methylcyclohexane are added. The polymerization is performed at 40° C.

After 70 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol relative to the lithium. The intrinsic viscosity ("initial" viscosity), which is measured at 0.1 $g \cdot dL^{-1}$ in toluene at 25° C., is 0.87 $dL \cdot g^{-1}$. 743 mL of a solution of 3-(N,N-dimethylaminopropyl) trimethoxysilane of CAS No. [2530-86-1] at 0.0516 $mol \cdot L^{-1}$ in methylcyclohexane is added to the solution of living polymer. After reacting at 40° C. for 10 minutes, a 0.1 $mol \cdot L^{-1}$ aqueous hydrochloric acid solution (2 mol. eq. of HCl relative to the n-butyllithium) is added and the solution is stirred for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.37 $dL \cdot g^{-1}$. The jump in viscosity, defined as the ratio of the said "final" viscosity to the said "initial" viscosity, is in this instance 1.57. The Mooney viscosity of the polymer thus coupled is 35.

The number-average molar mass $M_n$ of this copolymer, determined by the SEC technique, is 190 000 $g \cdot mol^{-1}$ and the polydispersity index PI is 1.07.

The mass percentage of coupled species, determined by the high resolution SEC technique, is 80%.

The microstructure of this copolymer is determined by the NIR method: the mass content of 1,4-trans units is 23%, that of 1,4-cis units is 20% and that of 1,2 units is 57%, each of these three contents being relative to the butadiene units. The mass content of styrene is 27%.

The glass transition temperature of this copolymer is −24° C.

The content of residual $SiOCH_3$ functions after hydrolysis/stripping/drying, determined by $^1H$ NMR, is zero.

Preparation of Polymer B: Functional SBR at the Chain End not in Accordance with the Invention 2.0 kg of styrene and 4.7 kg of butadiene, and also 354 ml of a 0.0695 $mol \cdot L^{-1}$ solution of tetrahydrofurfuryl ether in methylcyclohexane, are injected into a 90-liter reactor, maintained under a nitrogen pressure of approximately 2 bar, containing 45.3 kg of methylcyclohexane. After neutralization of the impurities in the solution to be polymerized by addition of n-butyllithium, 644 ml of 0.059 $mol \cdot L^{-1}$ n-butyllithium in methylcyclohexane are added. The polymerization is performed at 40° C.

After 70 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol relative to the lithium. The intrinsic viscosity ("initial" viscosity), which is measured at 0.1 $g \cdot dL^{-1}$ in toluene at 25° C., is 1.40 $dL \cdot g^{-1}$. 737 mL of a solution of 3-(N,N-dimethylaminopropyl) trimethoxysilane of CAS No. [2530-86-1] at 0.0516 $mol \cdot L^{-1}$ in methylcyclohexane is added to the solution of living polymer. After reacting at 40° C. for 1 minute, a 0.1 $mol \cdot L^{-1}$ aqueous hydrochloric acid solution (2 mol. eq. of HCl relative to the n-butyllithium) is added and the solution is stirred for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.58 $dL \cdot g^{-1}$. The jump in viscosity, defined as the ratio of the said "final" viscosity to the said "initial" viscosity, is in this instance 1.13. The Mooney viscosity of the polymer thus functionalized is 72.

The number-average molar mass $M_n$ of this copolymer, determined by the SEC technique, is 245 000 $g \cdot mol^{-1}$ and the polydispersity index PI is 1.20.

The mass percentage of species functionalized at the chain end, determined by the high resolution SEC technique, is 65%.

The microstructure of this copolymer is determined by the NIR method: the mass content of 1,4-trans units is 22%, that of 1,4-cis units is 19% and that of 1,2 units is 59%, each of these three contents being relative to the butadiene units. The mass content of styrene is 28%.

The glass transition temperature of this copolymer is −23° C.

The content of residual SiOCH$_3$ functions after hydrolysis/stripping/drying, determined by $^1$H NMR, is zero.

The change in Mooney viscosity over time of these polymers was evaluated during storage under usual storage conditions.

Samples of polymers A and B were enveloped in air-permeable polyethylene film and stored at a temperature of 25° C., at atmospheric pressure and protected from light.

Mooney viscosity measurements of these samples were taken at time intervals as shown in Table 1 below.

The results are given in Table 1 below:

TABLE 1

| Time | ML$_{(1+4)}$100° C. | |
|---|---|---|
| (j) | Polymer A | Polymer B |
| 0 | 35 | 72 |
| 4 | 35 | 85 |
| 7 | 35 | 85 |
| 11 | 35 | 92 |
| 15 | 35 | 98 |
| 19 | 35 | / |
| 30 | 35 | / |
| 61 | 35 | / |
| 130 | 35 | / |

In the table, "/" means that no Mooney measurement was taken (measured values unreliable beyond 100).

It is found that the polymer A, the modified diene elastomer according to the invention predominantly comprising the species coupled with a group bearing the silanol function and the amine function, does not undergo any change in Mooney viscosity during the storage period extending over 130 days, in contrast with the control elastomer modified with the same functionalization agent, but predominantly comprising the species functionalized at the chain end bearing the group bearing the silanol function and the amine function, at the chain end.

The invention claimed is:

1. A modified diene elastomer comprising a species represented by formula (1)

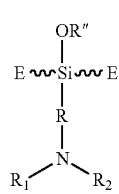

Formula 1 in which:
the symbol E denotes a diene elastomer,
R is a linear or branched C$_1$-C$_{10}$ alkylene, C$_6$-C$_{18}$ arylene or C$_7$-C$_{18}$ aralkylene divalent hydrocarbon-based group,
R$_1$ and R$_2$, which may be identical or different, represent a C$_1$-C$_{18}$ alkyl radical, or else R$_1$ and R$_2$ form, with N to which they are attached, a heterocycle,
—OR" represents an alkoxy function, hydrolysed to at least 50%, the alkyl radical in the alkoxy function comprising 1 to 5 carbon atoms.

2. The modified diene elastomer according to claim 1, wherein the coupled species of the elastomer is represented by formula (1b)

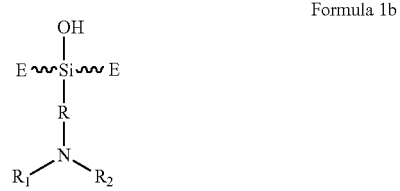

Formula 1b in which:
the symbol E denotes a diene elastomer,
R is a linear or branched C$_1$-C$_{10}$ alkylene, C$_6$-C$_{18}$ arylene or C$_7$-C$_{18}$ aralkylene divalent hydrocarbon-based group, R$_1$ and R$_2$, which may be identical or different, represent a C$_1$-C$_{18}$ alkyl radical, or else R$_1$ and R$_2$ form, with N to which they are attached, a heterocycle containing a nitrogen atom and at least one carbon atom.

3. The modified diene elastomer according to claim 1, wherein in formula (I), R represents the linear C3 alkylene radical.

4. The modified diene elastomer according to claim 1, wherein in formula (I), R$_1$ and R$_2$, which may be identical or different, represent a methyl or ethyl radical.

5. The modified diene elastomer according to claim 1, wherein the modified diene elastomer E is an SBR.

6. A process for synthesizing a modified diene elastomer, comprising the following steps:
anionic polymerization of at least one conjugated diene monomer in the presence of a polymerization initiator to obtain a living diene elastomer bearing an active site,
modification of the living diene elastomer bearing an active site obtained in the preceding step with a functionalization agent bearing at least one function that is hydrolysable into silanol and two functions that are reactive with the living elastomer, each directly linked to the silicon atom, and also a tertiary amine function, with a mole ratio of the functionalization agent to the polymerization initiator having a value ranging from 0.35 to 0.65 to obtain a modified elastomer,
hydrolysis of the modified elastomer obtained in the preceding step.

7. The process according to claim 6, wherein the functionalization agent is a compound bearing —Si(OR)$_3$, R being a hydrolysable C$_1$-C$_5$, and a tertiary amine function.

8. The process according to claim 6, wherein the functionalization agent is a compound bearing —SiX$_3$, X denoting a halogen, and a tertiary amine function.

9. The process according to claim 6, wherein the functionalization agent is represented by formula 2:

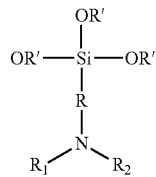

Formula 2 in which:
- R is a linear or branched $C_1$-$C_{10}$ alkylene, $C_6$-$C_{18}$ arylene or $C_7$-$C_{18}$ aralkylene divalent hydrocarbon-based group,
- $R_1$ and $R_2$, which may be identical or different, represent a $C_1$-$C_{18}$ alkyl radical, or else $R_1$ and $R_2$ form, with N to which they are attached, a heterocycle containing a nitrogen atom and at least one carbon atom,
- the substituted or unsubstituted radicals R', which may be identical to or different from each other, represent a $C_1$-$C_5$ alkyl group.

10. The process according to claim 6, wherein the hydrolysis step is performed by adding an aqueous hydrochloric acid solution.

11. A crosslinkable or crosslinked reinforced rubber composition based on at least one reinforcing filler and an elastomer matrix comprising at least one modified diene elastomer as defined in claim 1.

12. The crosslinkable or crosslinked reinforced rubber composition according to claim 11, wherein the reinforcing filler comprises a reinforcing mineral filler of siliceous type.

13. A tire tread comprising a crosslinkable or crosslinked rubber composition according to claim 11.

14. A tire comprising a tread according to claim 13.

15. The modified diene elastomer according to claim 1, wherein the —OR" represents an alkoxy function, hydrolysed to at least 80%, and the alkyl radical in the alkoxy function comprising 1 or 2 carbon atoms.

16. The modified diene elastomer according to claim 15, wherein the "—OR" which represents an alkoxy function is hydrolysed to 100%.

* * * * *